W. F. GROENE & H. C. PIERLE.
HOB GRINDING ATTACHMENT.
APPLICATION FILED APR. 8, 1911.
998,088.
Patented July 18, 1911.
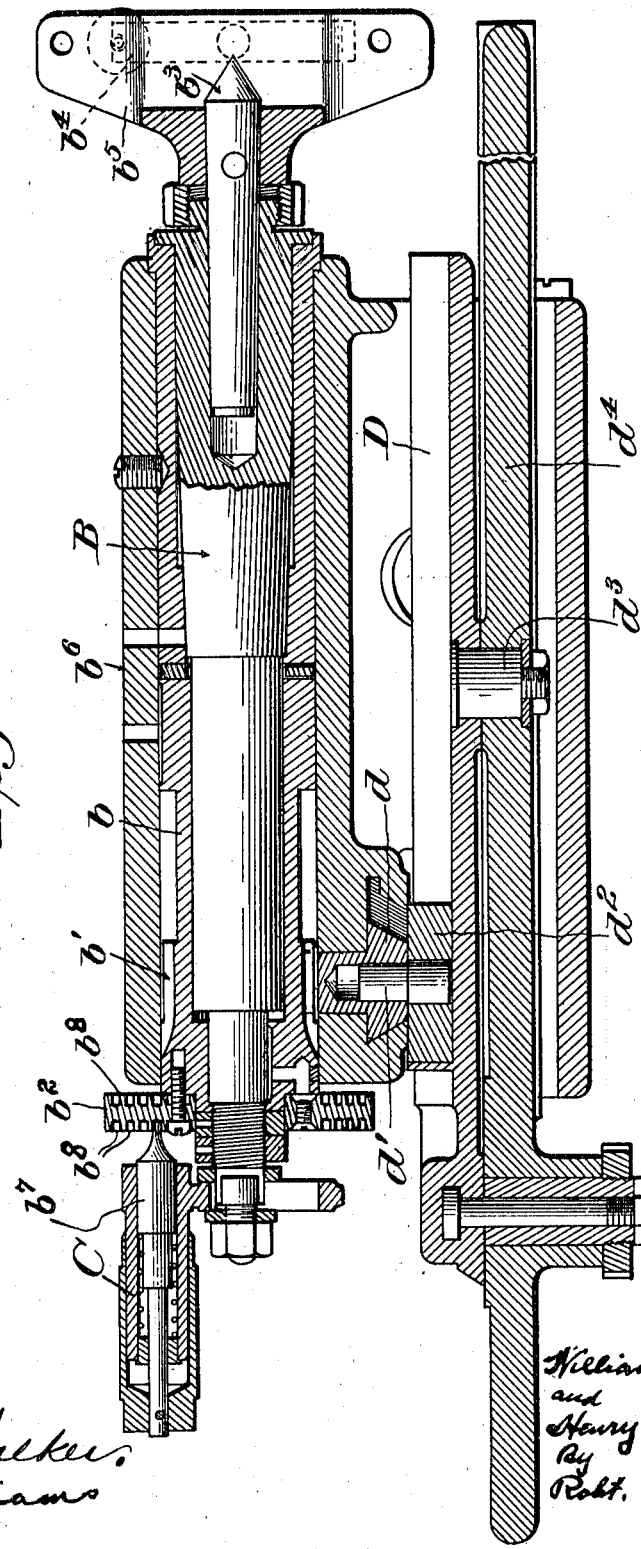

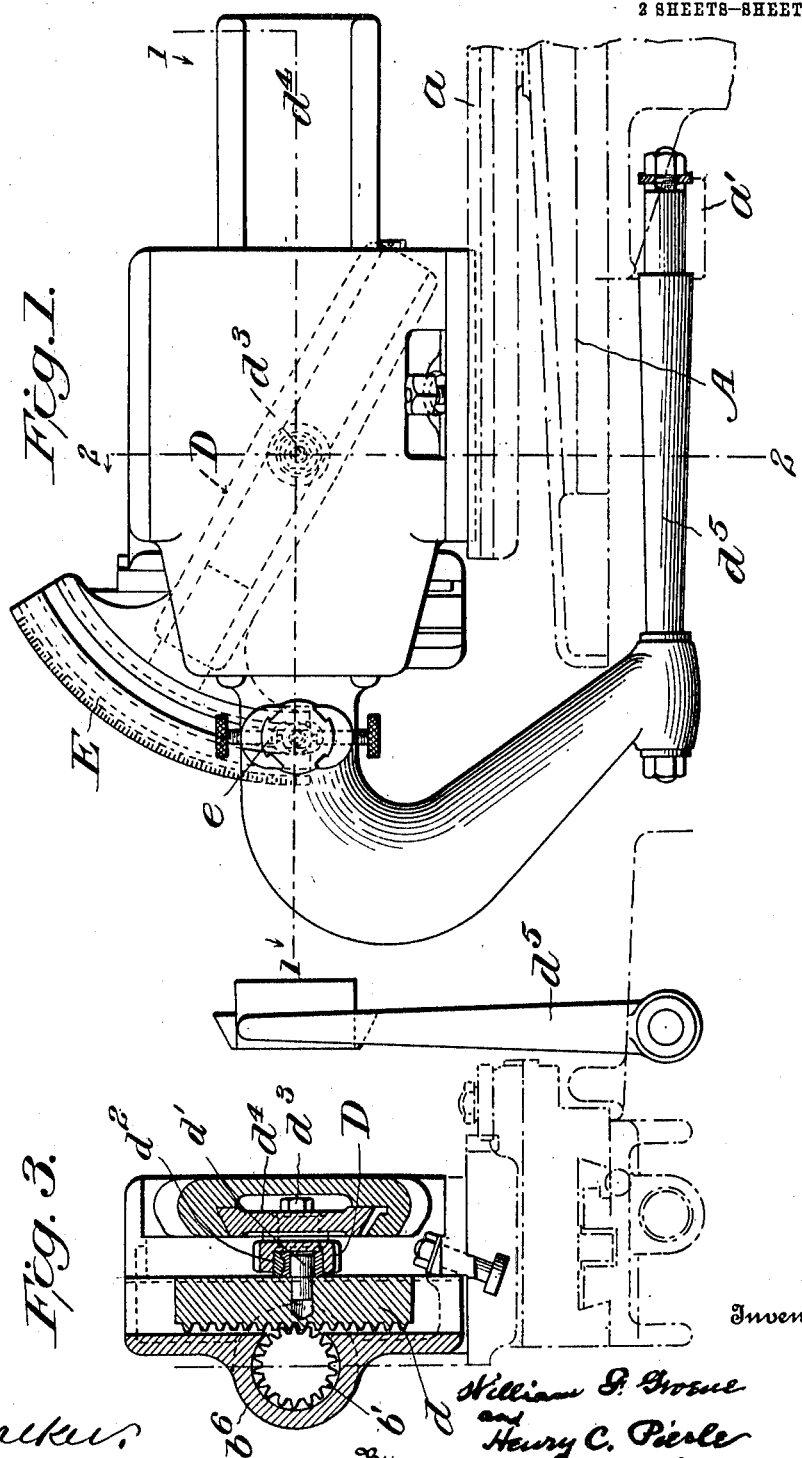

UNITED STATES PATENT OFFICE.

WILLIAM F. GROENE AND HENRY C. PIERLE, OF CINCINNATI, OHIO, ASSIGNORS TO R. K. LE BLOND MACHINE TOOL COMPANY, A CORPORATION OF OHIO.

HOB-GRINDING ATTACHMENT.

998,088.     Specification of Letters Patent.     Patented July 18, 1911.

Application filed April 8, 1911. Serial No. 619,784.

*To all whom it may concern:*

Be it known that we, WILLIAM F. GROENE and HENRY C. PIERLE, of Cincinnati, county of Hamilton, and State of Ohio, have invented a new and useful Improvement in Hob-Grinding Attachments, of which the following is a specification.

This invention relates to a new and improved attachment for cutter grinders and has reference more particularly to an attachment of this character adapted for grinding the teeth of hobs.

As is well known the ordinary hob as used on gear cutting machines has the faces cut on the spiral and one of the objects of the present invention is to produce a machine whereby the spiral may be ground mechanically.

A further object is to provide simple and improved means for giving the work a rotative movement as it travels past the grinding wheel.

A further object is to provide simple and efficient means for effecting close adjustments whereby delicate variations in the spirals may be obtained.

A further object is to provide improved means for indexing.

The invention will be hereinafter fully set forth and particularly pointed out in the claims.

In the accompanying drawings:—Figure 1 is a front view of a portion of a cutter grinder with our attachment applied thereto. Fig. 2 is a sectional view on the line 1—1 Fig. 1. Fig. 3 is a sectional view on the line 2—2 Fig. 1.

Referring to the drawing A designates a base or standard provided with the usual tail stock $a$ which may be of any suitable or preferred construction.

Our improved attachment is substituted for the usual head stock and comprises a spindle B upon which is loosely mounted a concentric sleeve $b$ which sleeve is provided with a pinion $b'$ and carries the index plate $b^2$. The spindle is provided with a center pin $b^3$, and the work or hob is held on an arbor between this center and the tail stock center, and is driven in the ordinary way by means of a dog $b^4$ and driver $b^5$ which are attached to the spindle B. Said sleeve $b$ is mounted in a suitable bearing $b^6$. Mounted on the rear end of the spindle B is an index handle C carrying an index pin $b^7$. Handle C is slotted so that the pin $b^7$ can be engaged with any of the openings $b^8$ in the plate $b^2$ the position of the handle being governed by the number of teeth in the hob. The index plate $b^2$ is held in rigid position with the sleeve $b$ by means of three filister head screws and is made reversible, that is to say, it is drilled with holes $b^8$ on both sides so as to have a bigger range of divisions as may be required by the hob.

Meshing with the pinion $b'$ is a sliding rack $d$ carrying a pin $d'$ which in turn engages a slidable shoe $d^2$ mounted to slide in a radius bar D. Said radius bar swivels on a pin $d^3$ carried by a stationary bar $d^4$ which is held in a fixed position by means of a rod $d^5$ which extends from the saddle $a'$ or fixed table of the machine. When the table traverses or the work passes before the grinding wheel the bar $d^4$ does not move. The radius bar D being attached to the stationary bar $d^4$ will also remain in fixed position and the result is that as the head travels along the shoe $d^2$ is forced to travel up and down in the slot of the radius bar. This in turn gives movement to the rack $d$ which meshes with the pinion $b'$ and through this connection causes rotative movement of the sleeve $b$ and thence through the index plate $b^2$ and locking pin $b^7$ to the spindle B. By withdrawing the locking pin $b^7$ from the hole in the plate, the connections between sleeve $b^2$ and spindle B is broken, and the spindle can be freely revolved by the index handle in any position.

Now if one of the hobs should have six teeth in it and an index plate be provided with six holes the spindle can be revolved in any one of the six different positions around the circumference. In other words, after grinding the first tooth, we withdraw the pin $b^7$ from the plate revolving it, to the next hole, return the spindle $\frac{1}{6}$ of the circle and let it drop in the next hole. This of course indexes the lock to the next tooth and so on around the circumference. The radius bar is provided with a segmental portion E provided with a scale, and may be locked in any adjusted position by means of a locking device $e$ carried by the bar $d^4$. It will be noted that any amount of movement in relation to the travel of the table can be given to the spindle by merely adjusting the radius bar D on the bar $d^4$. For instance, if the center line of the radius bar should coincide with the center line on the fixed bar, there would be no movement whatever to the spindle. As the radius bar is adjusted upwardly continued increased movement of the spindle is provided until the full capacity of the machine is reached. This will give rotation in one direction, or correct rotation for right hand hobs. If the radius bar is moved in the opposite direction correct rotation for left hand hobs is obtained.

The plate $b^2$ is provided with perforations $d^8$ on opposite sides, whereby the plate may be reversed and a greater number of indexing adjustments thereby obtained.

We claim as our invention:—

1. A hob grinding attachment comprising a spindle, a pivoted radius bar, means for adjusting said bar, and connections between said radius bar and spindle for imparting rotation to the latter.

2. A hob grinding attachment comprising a spindle, a radius bar, a slide engaging said radius bar, and means operated by said slide for imparting rotation to said spindle.

3. A hob grinding attachment comprising a spindle, a sleeve mounted on said spindle, a radius bar, and connections between said radius bar and said sleeve for imparting rotation to the latter.

4. A hob grinding attachment comprising a spindle, a sleeve mounted thereon, a pinion on said sleeve, a radius bar, a slide engaging said radius bar, and a rack meshing with said pinion and operatively connected with said slide.

5. A hob grinding attachment comprising a radius bar provided with a segmental enlargement, locking means engaging said enlargement whereby the latter may be adjusted to vary the inclination of said radius bar, a spindle, and means guided by said radius bar for imparting rotation to such spindle.

6. A hob grinding attachment comprising a radius bar provided with a segmental enlargement, locking means engaging said enlargement whereby the latter may be adjusted to vary the inclination of said radius bar, a slide engaging said radius bar, a spindle, and means operated by said slide for rotating said spindle.

7. A hob grinding attachment comprising a spindle having a sleeve mounted thereon, means for rotating said spindle, an index plate carried by said sleeve, and means for adjusting said index plate.

8. A hob grinding attachment comprising a radius bar, a slide engaging said radius bar, a spindle, a sleeve mounted on said spindle and connected to rotate therewith, means operated by said slide for rotating said sleeve, an index plate carried by said sleeve, and means for adjusting said index plate.

In testimony whereof we hereunto set our hands this 31st day of March, 1911, in the presence of two attesting witnesses.

WILLIAM F. GROENE.
HENRY C. PIERLE.

Witnesses:
GRACE A. PUGH,
WM. MEYER.

---

Copies of this patent may be obtained for five cents each, by addressing the "Commissioner of Patents, Washington, D. C."